United States Patent
Min et al.

(10) Patent No.: US 8,645,099 B2
(45) Date of Patent: Feb. 4, 2014

(54) DEPTH SENSOR, DEPTH ESTIMATION METHOD USING THE SAME, AND DEPTH ESTIMATION DEVICE INCLUDING THE SAME

(75) Inventors: Dong Ki Min, Seoul (KR); Young Gu Jin, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 13/025,793

(22) Filed: Feb. 11, 2011

(65) Prior Publication Data

US 2011/0202310 A1 Aug. 18, 2011

(30) Foreign Application Priority Data

Feb. 12, 2010 (KR) .................. 10-2010-0013405

(51) Int. Cl.
*G01B 5/18* (2006.01)
*G01B 11/28* (2006.01)
*G06K 9/00* (2006.01)

(52) U.S. Cl.
USPC .......................... 702/166; 356/630; 382/106

(58) Field of Classification Search
USPC ................. 702/166, 33, 40, 79, 127, 155, 702/158–159, 172, 189; 356/3, 3.03, 5.01, 356/5.03, 625, 630, 634; 382/106, 382/312–313, 321; 250/208.1, 216, 227.12; 73/1.56, 1.79, 1.81
See application file for complete search history.

(56) References Cited

PUBLICATIONS

Seitz, P., Smart Pixels, 2004, Optical Metrology in Production Engineering, Proc. of SPIE vol. 5457, pp. 92-104.*
Nieuwenhove et al., A CAPD Based Time-of-Flight Ranging Pixel with Wide Dynamic Range, 2008, Optical and Digital Image Processing, Proc. of SPIE vol. 7000, 9 pp.*
Buttgen et al., High-Speed and High-Sensitive Demodulation Pixel for 3D-Imaging, 2006, Three-Dimensional Image Capture and Applications VII, Proc. of SPIE-IS&T Electronic Imaging, SPIE vol. 6056, 12 pp.*

* cited by examiner

*Primary Examiner* — Toan Le
(74) *Attorney, Agent, or Firm* — Sughrue Mion, PLLC

(57) ABSTRACT

A depth estimation apparatus and method are provided. The depth estimation method includes grouping a plurality of frame signals generated by a depth pixel into a plurality of frame signal groups which are used to estimate a depth to an object without a depth estimation error caused by an omission of a frame signal, the grouping of the a plurality of frame signals based on whether an omitted frame signal exists in the plurality of frame signals and based on a continuous pattern of the plurality of frame signals; and estimating the depth to the object using each of the plurality of frame signal groups.

20 Claims, 20 Drawing Sheets $$\hat{\theta} = \tan^{-1} \frac{A1(t1) - A3(t3)}{A0(t0) - A2(t2)}$$

DEPTH SENSOR, DEPTH ESTIMATION METHOD USING THE SAME, AND DEPTH ESTIMATION DEVICE INCLUDING THE SAME

CROSS-REFERENCE TO RELATED APPLICATIONS

This application claims priority from Korean Patent Application No. 10-2010-0013405, filed on Feb. 12, 2010 in the Korean Intellectual Property Office, the disclosure of which is incorporated herein by reference in its entirety.

BACKGROUND

The present disclosure relates to technology for measuring a depth to an object using a time-of-flight (TOF) principle, and more particularly, to a depth sensor for extracting a plurality of frame signals having different phases from light reflected from an object and estimating a depth to the object based on the frame signals, a depth estimation method using the same, and a depth estimation device including the same.

Sensors are elements that detect the state or the position of an object and convert a detection result into an electrical signal. Sensors include light sensors, temperature sensors, pressure sensors, magnetic sensors, and depth sensors.

A depth sensor measures a time that a pulse signal has taken to travel from a source to an object (or a target to be measured) and back using the TOF principle and calculates a depth or a distance between the depth sensor and the object. The signal output from the source in the depth sensor may be a microwave signal, a light wave signal, or an ultrasonic wave signal.

Depth sensors, which calculate a depth to an object using the TOF principle, use a plurality of frame signals having different phases. For instance, a depth sensor using a depth pixel with a 4-tap pixel structure simultaneously applies gate signals having 0-degree, 90-degree, 180-degree and 270-degree phase differences from a signal output from a source to the depth pixel and extracts a plurality of frame signals from an optical signal reflected by an object to calculate a depth to the object. A depth sensor using a depth pixel with a 1-tap or 2-tap pixel structure applies gate signals having 0-degree, 90-degree, 180-degree and 270-degree phase differences from a signal output from a source to the depth pixel with time differences and calculates a depth to an object using a plurality of frame signals measured with time differences.

When any one of the frame signals is omitted, an error occurs in the depth to the object calculated by a depth sensor. The omission of a frame signal is highly likely to happen when a depth sensor using a depth pixel with the 1-tap or 2-tap pixel structure operates at high speed, i.e., at a high frame per second (FPS) rate.

SUMMARY

Some exemplary embodiments of the present disclosure provide a depth sensor for compensating for an error occurring due to omission of a frame signal during calculation of a depth to an object, a depth estimation method using the same, and a depth estimation device including the same.

According to some exemplary embodiments of the present disclosure, there is provided a depth estimation method including the operations of outputting an optical signal to an object; generating a plurality of frame signals based on a reflected optical signal from the object and a plurality of gate signals periodically applied to a depth pixel with predetermined phase differences from the optical signal and providing the plurality of frame signals and frame information of each of the plurality of frame signals for estimation of a depth to the object; grouping the plurality of frame signals into a plurality of frame signal groups to be used to estimate the depth to the object without an error based on existence or non-existence of an omitted frame signal in the plurality of frame signals and a continuous pattern of the plurality of frame signals; and estimating the depth to the object using each of the plurality of frame signal groups.

The operation of grouping may include comparing frame information of a current frame signal with frame information of a previous frame signal among the plurality of frame signals and detecting an omitted frame signal in the plurality of frame signals based on a result of the comparison and determining the continuous pattern of the plurality of frame signals; and grouping the plurality of frame signals into the plurality of frame signal groups based on the existence or non-existence of an omitted frame signal and the continuous pattern of the plurality of frame signals.

Alternatively, the operation of grouping may include comparing frame information of a current frame signal with frame information of a previous frame signal among the plurality of frame signals, determining the existence or non-existence of an omitted frame signal based on a result of the comparison, and generating an index value indicating the existence or non-existence of an omitted frame signal; comparing the frame information of the current frame signal with the index value and determining the continuous pattern of the plurality of frame signals based on a result of the comparison; and grouping the plurality of frame signals into the plurality of frame signal groups based on the existence or non-existence of an omitted frame signal and the continuous pattern of the plurality of frame signals.

A current frame signal group and a previous frame signal group may share at least one frame signal with each other.

The operation of estimating the depth may include detecting a phase difference between the optical signal output to the object and the reflected optical signal from the object based on a ratio between a difference between two frame signals and a difference between other two frame signals in each of the plurality of frame signal groups; and estimating the depth to the object based on a frequency of the optical signal and the phase difference.

The depth estimation method may be realized by executing a computer program for performing the depth estimation method stored in a computer readable recording medium.

According to other exemplary embodiments of the present disclosure, there is provided a depth sensor including a light source, a depth pixel, a digital circuit, a memory, and a depth estimator.

The light source may output an optical signal to an object. The depth pixel may generate a plurality of frame signals based on a reflected optical signal from the object and a plurality of gate signals periodically received with predetermined phase differences from the optical signal. The digital circuit may convert the plurality of frame signals into digital signals and output the digital signals. The memory may store and provide the plurality of frame signals and frame information of each of the plurality of frame signals for estimation of a depth to the object. The depth estimator may group the plurality of frame signals into a plurality of frame signal groups to be used to estimate the depth to the object without an error based on existence or non-existence of an omitted frame signal in the plurality of frame signals and a continuous pattern of the plurality of frame signals and estimate the depth to the object using each of the plurality of frame signal groups.

According to further exemplary embodiments of the present disclosure, there is provided a depth estimation device including the depth sensor and a processor which controls an operation of the depth sensor, the depth sensor including a light source, a depth pixel, a digital circuit, a memory, and a depth estimator.

The light source may output an optical signal to an object. The depth pixel may generate a plurality of frame signals based on a reflected optical signal from the object and a plurality of gate signals periodically received with predetermined phase differences from the optical signal. The digital circuit may convert the plurality of frame signals into digital signals and output the digital signals. The memory may store and provide the plurality of frame signals and frame information of each of the plurality of frame signals for estimation of a depth to the object. The depth estimator may group the plurality of frame signals into a plurality of frame signal groups to be used to estimate the depth to the object without an error based on existence or non-existence of an omitted frame signal in the plurality of frame signals and a continuous pattern of the plurality of frame signals and estimate the depth to the object using each of the plurality of frame signal groups.

BRIEF DESCRIPTION OF THE DRAWINGS

The above and other features and advantages will become more apparent by describing in detail exemplary embodiments thereof with reference to the attached drawings in which.

DETAILED DESCRIPTION OF THE EXEMPLARY EMBODIMENTS

Figure 1:
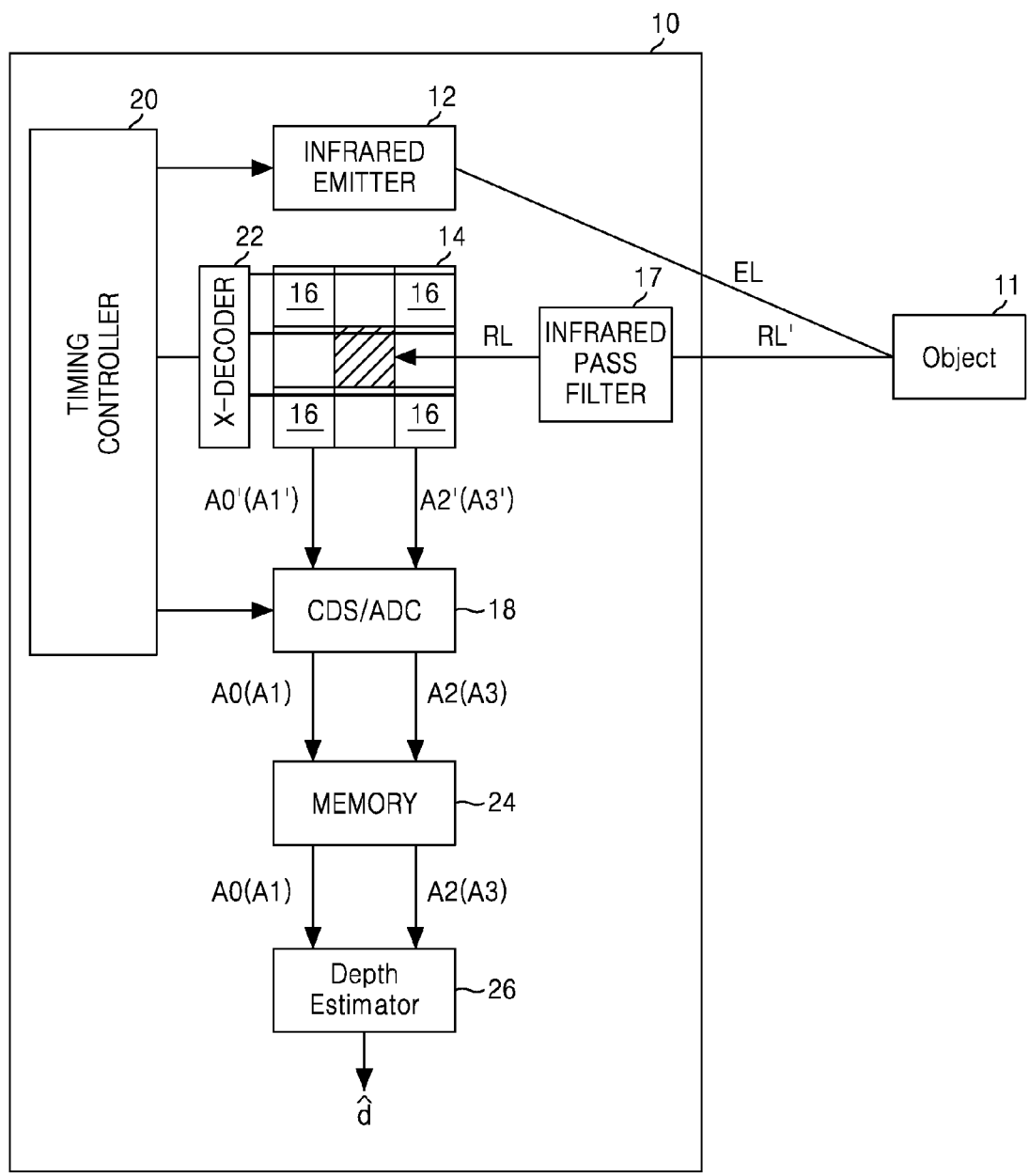
FIG. 1 is a block diagram of a depth sensor including a depth pixel with a 2-tap pixel structure according to an exemplary embodiment.

The general inventive concept now will be described more fully hereinafter with reference to the accompanying drawings, in which exemplary embodiments are shown. The exemplary embodiments may, however, be embodied in many different forms and the general inventive concept should not be construed as limited to the exemplary embodiments set forth herein. Rather, these exemplary embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a depth sensor 10 including a depth pixel with a 2-tap pixel structure according to an exemplary embodiment of the present disclosure. The depth sensor 10 compensates for an omitted frame that may occur during a high-speed operation and then estimates (calculates or measures) a depth (or a distance) to an object using the time-of-flight (TOF) principle. The depth sensor 10 may be implemented in a separate chip to calculate depth information or may be implemented in a color image sensor chip to be used to measure both three-dimensional (3D) image information and depth information at one time. In the exemplary embodiments of the present disclosure, a depth pixel for detecting depth information and a pixel for detecting image information may be implemented together in a single pixel array of a 3D image sensor.

The depth sensor 10 may emit an optical signal EL (e.g., a modulated infrared signal) using a light source (e.g., an infrared emitter 12) and measure a depth to an object using a time difference $t_\Delta$ between emission of the modulated infrared signal EL from the infrared emitter 12 and reception of a reflected infrared signal RL corresponding to the modulated infrared signal EL that has been reflected by the object 11. The time difference $t_\Delta$ is given by Equation (1):

$$t_\Delta = \frac{2d}{c} \qquad (1)$$

where "d" is a distance, i.e., a depth between the depth sensor 10 and the object 11, and "c" is the velocity of light.

The depth sensor 10 includes the infrared emitter 12, a depth sensor array 14, an infrared pass filter 17, a correlated double sampling (CDS)/analog-to-digital conversion (ADC) circuit 18, a timing controller 20, a row decoder (X-decoder) 22, a memory 24, and a depth estimator 26. The depth sensor 10 may also include an active load circuit (not shown) controlled by the timing controller 20 to transmit a column line signal to the CDS/ADC circuit 18. The depth sensor 10 may further include a lens (not shown) converging incident light reflected by the object 11 to the infrared pass filter 17. The operation of a lens module (not shown) including the lens may be controlled by the timing controller 20.

The infrared emitter 12 is controlled by the timing controller 20 to emit the optical signal, e.g., the modulated infrared signal, EL. The infrared emitter 12 may be implemented by a light emitting diode (LED) or an organic LED (OLED). The depth sensor 10 may include a plurality of infrared emitters around the depth sensor array 14, but for clarity of the description, only one infrared emitter 12 is illustrated.

The depth sensor array 14 includes a plurality of depth pixels 16. Each of the depth pixels 16 generates a plurality of frame signals based on an optical signal reflected by the object 11 and a plurality of gate signals periodically received with predetermined phase differences.

Figure 2:
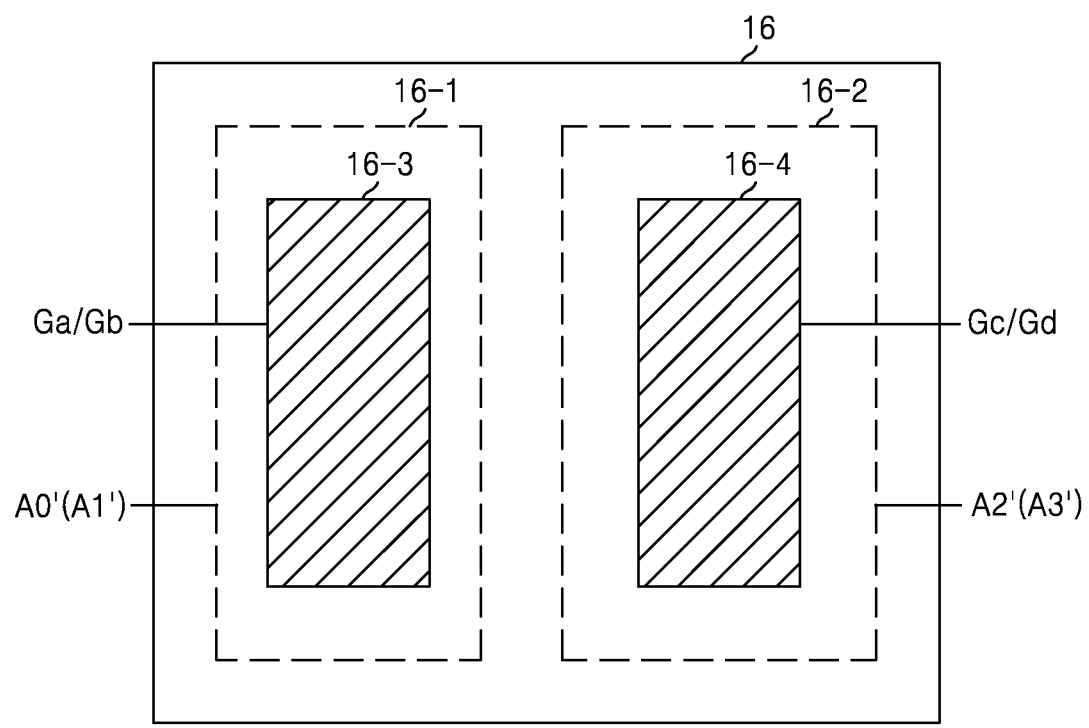
FIG. 2 is a layout of the depth pixel with the 2-tap pixel structure illustrated in FIG. 1.
Figure 3:
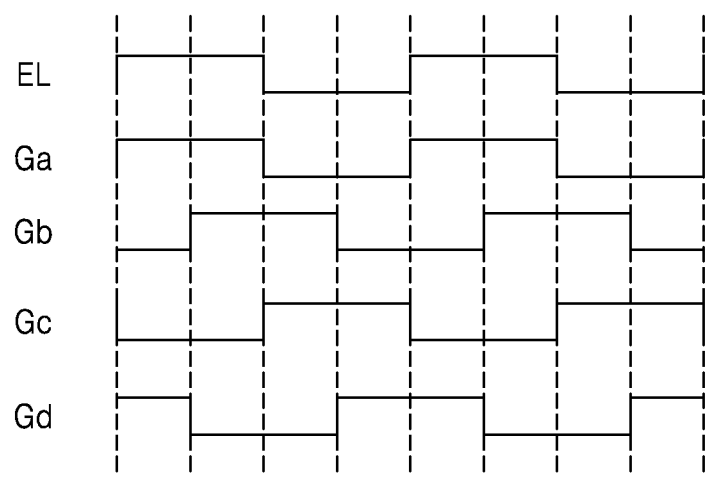
FIG. 3 is a diagram of gate signals applied to the 2-tap pixel structure illustrated in FIG. 2.

FIG. 2 is a layout of one of the depth pixels 16 with the 2-tap pixel structure illustrated in FIG. 1. FIG. 3 is a diagram of gate signals applied to the 2-tap pixel structure illustrated in FIG. 2.

Each of the depth pixels 16 may be a depth pixel 16 having the 2-tap pixel structure illustrated in FIG. 2. The depth pixel 16 having the 2-tap pixel structure may measure frame signals A0' and A2' in response to gate signals Ga and Gc having a 180-degree phase difference therebetween and then measure frame signals A1' and A3' in response to gate signals Gb and Gd having a 180-degree phase difference therebetween. In other words, the gate signals Ga through Gd having a 90-degree phase difference are periodically applied to the depth pixel 16.

Each of the depth pixels 16 may accumulate photoelectrons or photocharges generated from the infrared signal RL received through the infrared pass filter 17 for a predetermined period of time, e.g., an integration time, and output the frames signals A0' and A2' and A1' and A3' generated according to a result of the accumulation. A frame signal $A_k$ generated by each depth pixel 16 may be expressed by Equation (2):

$$A_k = \sum_{n=1}^{N} a_{k,n} \qquad (2)$$

At this time, k=0 when the gate signal Ga input to a photoelectric converter, e.g., a photo gate, of the depth pixel 16 and the modulated infrared signal EL have a 0-degree phase difference from each other; k=1 when the gate signal Gb and the modulated infrared signal EL have a 90-degree phase difference from each other; k=2 when the gate signal Gc and the modulated infrared signal EL have a 180-degree phase difference from each other; and k=3 when the gate signal Gd and the modulated infrared signal EL have a 270-degree phase difference from each other, as shown in FIG. 3. In Equation (2), $a_{k,n}$ indicates the number of photoelectrons or photocharges generated at the depth pixel 16 when an n-th ("n" is a natural number) gate signal having a phase difference corresponding to "k" is applied to the depth pixel 16 and N=fm*Tint, where "fm" is a frequency of the modulated infrared signal EL and "Tint" is an integration time.

Figure 4:
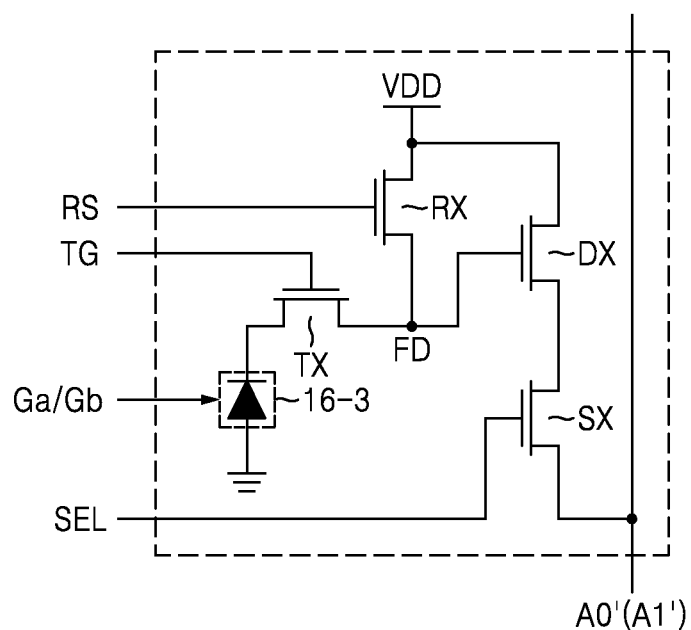
FIG. 4 is a circuit diagram of a photoelectric converter and transistors which are implemented in a first active region illustrated in FIG. 2.
Figure 5:
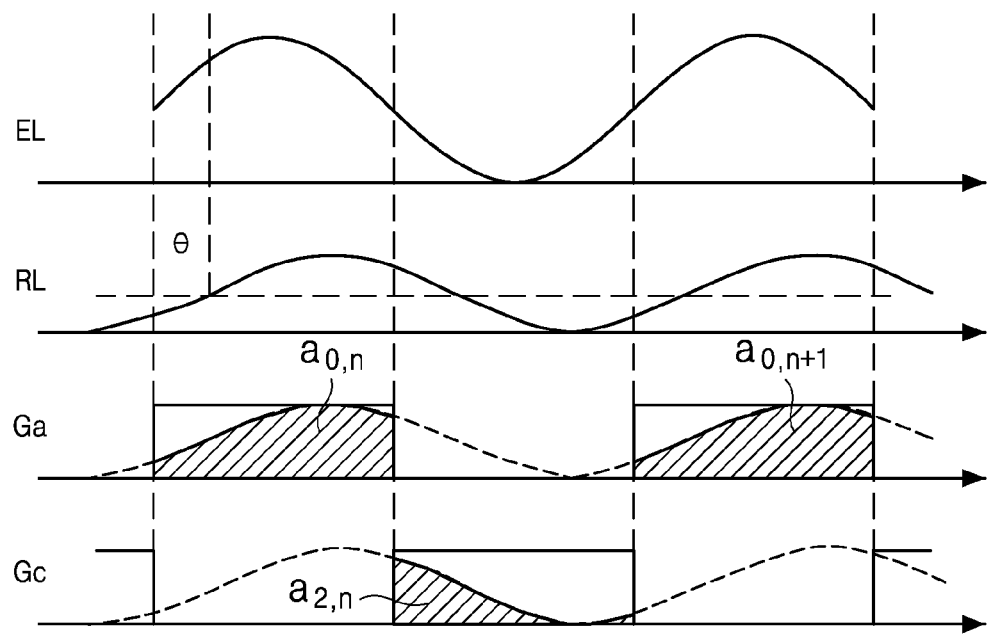
FIG. 5 is a diagram of waveforms of infrared signals and gate signals according to one or more exemplary embodiments.

FIG. 4 is a circuit diagram of a photoelectric converter and transistors which are implemented in a first active region 16-1 illustrated in FIG. 2. FIG. 5 is a diagram of waveforms of the infrared signals EL and RL and gate signals according to one or more exemplary embodiments of the present disclosure.

As illustrated in FIG. 2, the depth pixel 16 with the 2-tap pixel structure includes photoelectric converters 16-3 and 16-4 implemented in active regions 16-1 and 16-2, respectively. The active regions 16-1 and 16-2 have the same structure, and therefore, elements implemented in the active region 16-1 will only be described below.

Referring to FIG. 4, the active region 16-1 includes the photoelectric converter 16-3 and four transistors RX, TX, DX, and SX. The photoelectric converter 16-3 generates photocharges based on the gate signal Ga or Gb and the reflected infrared signal RL. The photoelectric converter 16-3 may be turned on or off in response to the gate signal Ga output from the timing controller 20. For instance, the photoelectric converter 16-3 may generate photocharges based on the reflected infrared signal RL when the gate signal Ga is at a high level and may not generate photocharges when the gate signal Ga is at a low level. The photoelectric converter 16-3 is a photo sensitive device and may be implemented by a photo diode, a photo transistor, a photo gate, or a pinned photo diode (PPD).

The reset transistor RX resets a floating diffusion region FD in response to a reset signal RS output from the row decoder 22. The transfer transistor TX transfers photocharges generated at the photoelectric converter 16-3 to the floating diffusion region FD in response to a control signal TG output from the row decoder 22. The drive transistor DX functions as a source follower buffer amplifier and buffers in response to photocharges collected in the floating diffusion region FD to output the frame signal A0' or A1'. The selection transistor SX outputs the frame signal A0' or A1' output from the drive transistor DX to a column line in response to a control signal SEL output from the row decoder 22. The active region 16-1 including the photoelectric converter 16-3 and the four transistors TX, RX, DX, and SX shown in FIG. 4 is only an example.

Referring back to FIG. 1, a digital circuit, i.e., the CDS/ADC circuit 18 is controlled by the timing controller 20 to perform CDS and ADC on pixel signals, i.e., the frame signals A0' and A2' and A1' and A3', output from the depth pixel 16 and to output digital frame signals A0 and A2 and A1 and A3. The depth sensor 10 may further include active load circuits transmitting frame signals output from a plurality of column lines included in the depth sensor array 14 to the CDS/ADC circuit 18.

The memory 24 may be implemented by a buffer. The memory 24 receives and stores the digital frame signals A0 and A2 and A1 and A3 output from the CDS/ADC circuit 18, stores frame information of each of the digital frame signals A0 and A2 and A1 and A3, and provides the digital frame signals A0 and A2 and A1 and A3 and the frame information for estimation of a depth to the object 11 to the depth estimator 26.

The depth estimator 26 estimates a phase difference between the modulated infrared signal EL and the reflected infrared signal RL based on the digital frame signals A0 and A2 and A1 and A3 output from the memory 24 and then estimates the depth to the object 11 based on the phase difference. The phase difference estimated by the depth estimator 26 may be represented with $\hat{\theta}$ and expressed by Equation (3):

$$\hat{\theta} = 2\pi f_m t_\Delta = \tan^{-1} \frac{A_1 - A_3}{A_0 - A_2} \quad (3)$$

The depth estimator 26 estimates a depth $\hat{d}$ to the object 11 based on the estimated phase difference $\hat{\theta}$ using Equation (4):

$$\hat{d} = \frac{c}{4\pi f_m} \hat{\theta} \quad (4)$$

where "c" is the velocity of light and "$f_m$" is a frequency of the modulated infrared signal EL.

Figure 6:
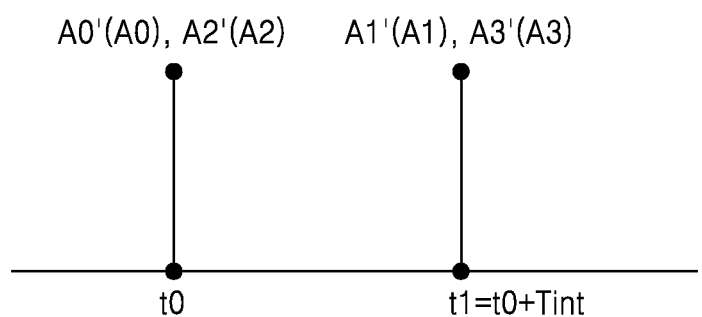
FIG. 6 is a conceptual diagram of a method of estimating digital frame signals using the depth sensor illustrated in FIG. 1.

FIG. 6 is a conceptual diagram of a method of obtaining a phase difference between the modulated infrared signal EL emitted by the infrared emitter 12 and the reflected infrared signal RL using the depth sensor 10 illustrated in FIG. 1.

When the gate signals Ga and Gc having a 180-degree phase difference, as illustrated in FIGS. 3 and 5, are applied to the depth pixel 16 having the 2-tap pixel structure at a first time point t0, the depth pixel 16 outputs the measured frame signals A0' and A2'. When the gate signals Gb and Gd having a 180-degree phase difference, as illustrated in FIGS. 2 and 3, are applied to the depth pixel 16 at a second time point t1, the depth pixel 16 outputs the measured frame signals A1' and A3'. The integration time Tint comes between the first time point t0 and the second time point t1.

In other words, the depth pixel 16 cannot simultaneously measure the frame signals A0' through A3', and thus measures (or detects) them through two different measurements, at each of which two frame signals are measured, with an interval of the integration time Tint. Therefore, the depth estimator 26 estimates the phase difference $\hat{\theta}$ based on the digital frame signals A0 through A3 using Equation (5):

$$\hat{\theta} = \tan^{-1} \frac{A_1(t_1) - A_3(t_1)}{A_0(t_0) - A_2(t_0)} \quad (5)$$

Accordingly, the depth estimator 26 estimates (or calculates) depth information using Equations (4) and (5) and outputs the estimated (or calculated) depth $\hat{d}$.

The above description was related to the estimation of a depth to the object, which is performed by the depth estimator 26 when any one of the frame signals A0 through A3 provided from the memory 24 is not omitted. However, when the depth sensor 10 operates at high speed, a probability of omission of a frame signal output from the memory 24 increases and an error occurs in depth estimation to the object 11 due to the omission of the frame signal.

The depth estimator 26 compensates for a depth estimation error that may occur due to the omission of a frame signal. For instance, the depth estimator 26 groups a plurality of frame signals into frame signal groups that can be used to estimate the depth to the object 11 without an error in consideration of the existence of an omitted frame signal among the frame signals A0 through A3 and a continuous pattern of the plurality of frame signals, and then estimates the depth to the object 11 using each of the frame signal groups.

Figure 7:
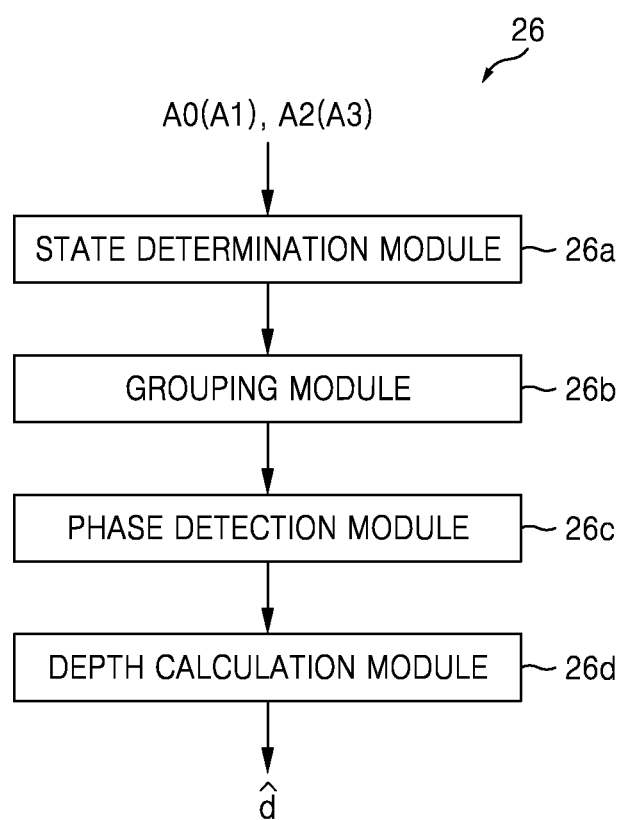
FIG. 7 is a block diagram of a depth estimator illustrated in FIG. 1.

FIG. 7 is a block diagram of the depth estimator 26 illustrated in FIG. 1. Referring to FIG. 7, the depth estimator 26 includes a state determination module 26a, a grouping module 26b, a phase detection module 26c, and a depth calculation module 26d.

The state determination module 26a compares frame information of a current frame signal with frame information of a previous frame signal among a plurality of frame signals provided from the memory 24 and based on a comparison result, detects omission of a frame signal from the plurality of frame signals and determines the continuous pattern of the plurality of frame signals. In the 2-tap pixel structure, pairs of frame signals, i.e., a pair of the frame signals A0 and A2 and a pair of the frame signals A1 and A3 are alternately output. At this time, it is assumed that the frame information is "0" when the pair of frame signals A0 and A2 are output and "1" when the pair of frame signals A1 and A3 are output.

The state determination module 26a determines that there is no omitted frame signal and the pair of frame signals A0 and A2 and the pair of frame signals A1 and A3 are alternately output in the continuous pattern of the frame signals when the frame information of the current and previous frames is (0, 1) or (1, 0). However, when the frame information of the current and previous frame signals is (0, 0) or (1, 1), the state determination module 26a determines that there is omission of a frame signal from the frame signals provided from the memory 24 and the pair of frame signals A0 and A2 or A1 and A3 are consecutively output in the continuous pattern of frame signals. At this time, an error occurs in the estimation of the depth to the object 11 due to the omission of a frame signal.

The grouping module 26b groups a plurality of frame signals into a plurality of frame signal groups based on the existence of an omitted frame signal in the frame signals provided from the memory 24 and the continuous pattern of the frame signals. At this time, the frame signals are grouped such that an error does not occur in calculation of the depth to the object, and such that a current frame signal group and a previous frame signal group share at least one frame signal with each other.

Table 1 shows examples of frame information of frame signals provided from the memory 24.

TABLE 1

| Time | t0 | t1 | t2 | t3 | t4 | t5 | t6 | t7 |
|------|----|----|----|----|----|----|----|----|
| pf   | 1  | 0  | 1  | 0  | 1  | 1  | 0  | 1  |
| f    | 0  | 1  | 0  | 1  | 1  | 0  | 1  | 0  |

Here, "f" denotes frame information of a current frame signal and "pf" denotes frame information of a previous frame signal.

The grouping module 26b groups frame signals such that a current frame signal group and a previous frame signal group share at least one frame signal with each other. For instance, a frame signal group corresponding to time points t0 and t1 and a frame signal group corresponding to time points t1 and t2 share a frame signal at the time point t1. Such grouping is referred to as "a moving window."

At a time point t4, since the frame information of a current frame signal and a previous frame signal is (1, 1), a pair of frame signals A0 and A2 corresponding to "0" frame information is omitted. Accordingly, the grouping module 26b excludes a frame signal group corresponding to time points t3 and t4 from the calculation of the depth to the object 11. That is, the grouping module 26b does not create a group corresponding to time points t3 and t4, and thus a group corresponding to time points t3 and t4 is not used in Equation 5. Therefore, it is a frame signal group corresponding to time points t4 and t5 that is used for the depth estimation following a frame signal group corresponding to the time points t2 and t3.

Unlike the depth sensor 10 according to the exemplary embodiments of the present disclosure, a depth sensor of the related art groups frame signals into groups corresponding to time points t0 and t1, t2 and t3, t4 and t5, and t6 and t7 so that adjacent frame signal groups do not share any frame signal with each other. Moreover, the depth sensor of the related art excludes frame signals corresponding to the time points t4 and t5, where omission of a frame signal occurs, from the depth calculation.

The phase detection module 26c detects a phase difference between the modulated infrared signal EL emitted to the object 11 and the reflected infrared signal RL received from the object 11 based on a ratio between a difference between two frame signals and a difference between two other frame signals in each frame signal group. The phase difference detected by the phase detection module 26c may be a value of an arc tangent to the ratio between the two differences in each frame signal group (refer to Equations (3) and (5)).

The depth calculation module 26d estimates the depth to the object 11 based on the frequency of the modulated infrared signal EL and the phase difference. Since a frame signal group causing an error in the depth estimation is excluded by the grouping module 26b, an error does not occur when the depth to the object 11 is calculated using each of frame signals groups output from the grouping module 26b. In addition, the depth estimator 26 uses the moving window, so that the depth sensor 10 provides more natural depth images than related art depth sensors.

Figure 8:
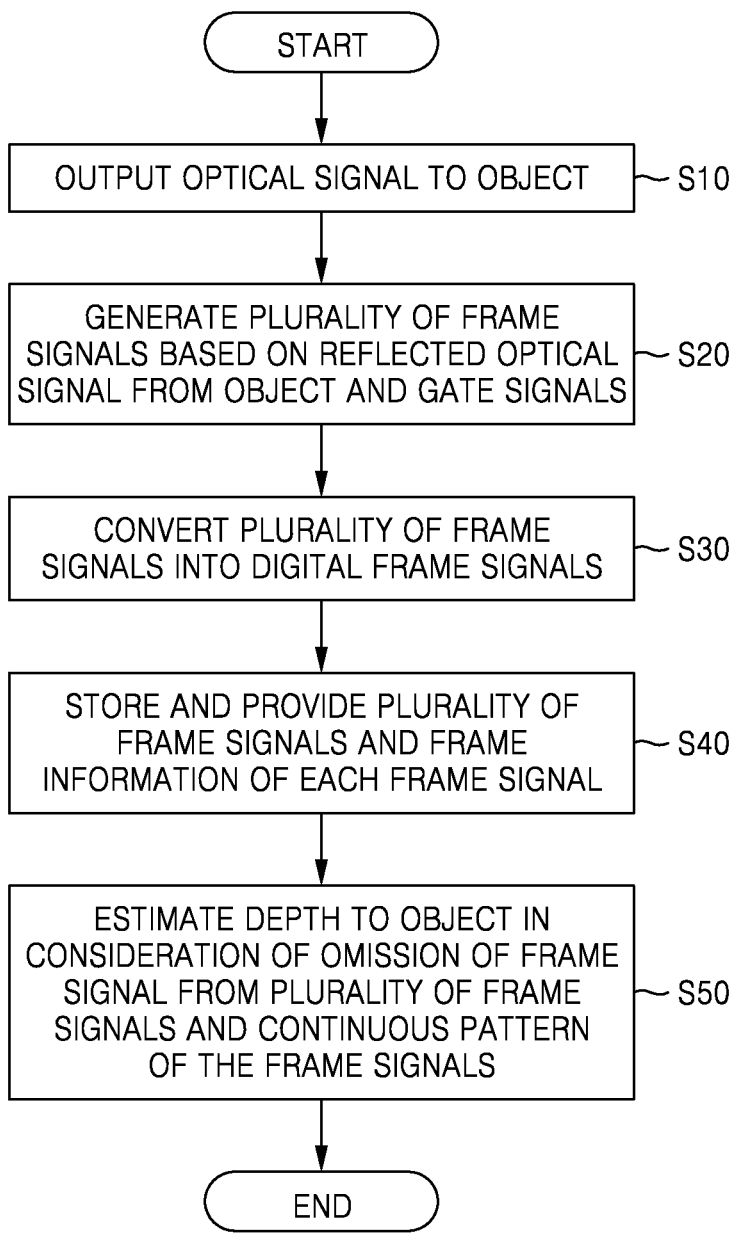
FIG. 8 is a flowchart of a depth estimation method of the depth sensor illustrated in FIG. 1.

FIG. 8 is a flowchart of a depth estimation method of the depth sensor 10 illustrated in FIG. 1. The method will be sequentially described with reference to FIGS. 1, 7 and 8 below.

The depth sensor 10 outputs the optical signal EL emitted by the infrared emitter 12 to the object 11 in operation S10 and receives the reflected optical signal RL from the object 11. The depth sensor array 14 generates and outputs a plurality of the frame signals A0' through A3' based on the reflected optical signal RL and the gate signals Ga through Gd in operation S20.

The digital circuit 18 converts the frame signals A0' through A3' output from the depth sensor array 14 into the digital frame signals A0 through A3 in operation S30. The memory 24 stores the frame signals A0 through A3 and frame information corresponding to each of the frame signals A0 through A3 and provides a plurality of frame signals and frame information to the depth estimator 26 in operation S40.

The depth estimator 26 estimates the depth to the object 11 using each of frame signal groups having no errors in consideration of omission of a frame signal from the plurality of frame signals and a continuous pattern of the frame signals in operation S50. The depth estimation of the depth estimator 26 will be described in detail with reference to FIG. 9 below.

Figure 9:
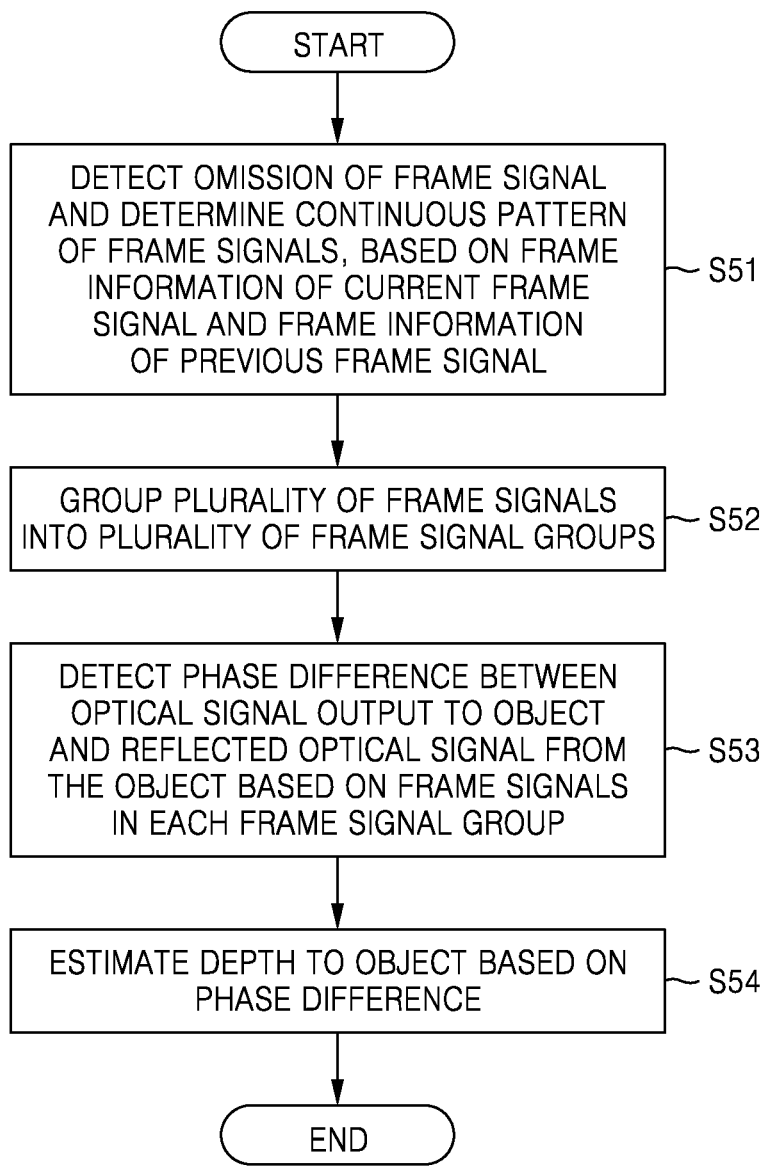
FIG. 9 is a flowchart of a procedure of depth estimation performed by the depth estimator illustrated in FIG. 1.

FIG. 9 is a flowchart of a procedure of depth estimation performed by the depth estimator 26 illustrated in FIG. 1. The state determination module 26a compares frame information of a current frame signal with frame information of a previous frame signal among the plurality of frame signals and based on a comparison result, detects the omission of a frame signal from the plurality of frame signals and determines a continuous pattern of the plurality of frame signals in operation S51.

The grouping module 26b groups the plurality of frame signals into a plurality of frame signal groups based on the existence or non-existence of an omitted frame signal and the continuous pattern of the plurality of frame signals in operation S52. At this time, the plurality of frame signals are grouped using a moving window, so that an error does not occur during depth estimation.

The phase detection module 26c detects a phase difference between the optical signal EL output to the object 11 and the reflected optical signal RL from the object 11 based on a ratio between a difference between two frame signals and a difference between two other frame signals in each of the frame signal groups in operation S53. The depth calculation module 26d estimates the depth to the object based on the frequency of the optical signal EL and the phase difference in operation S54.

Figure 10:
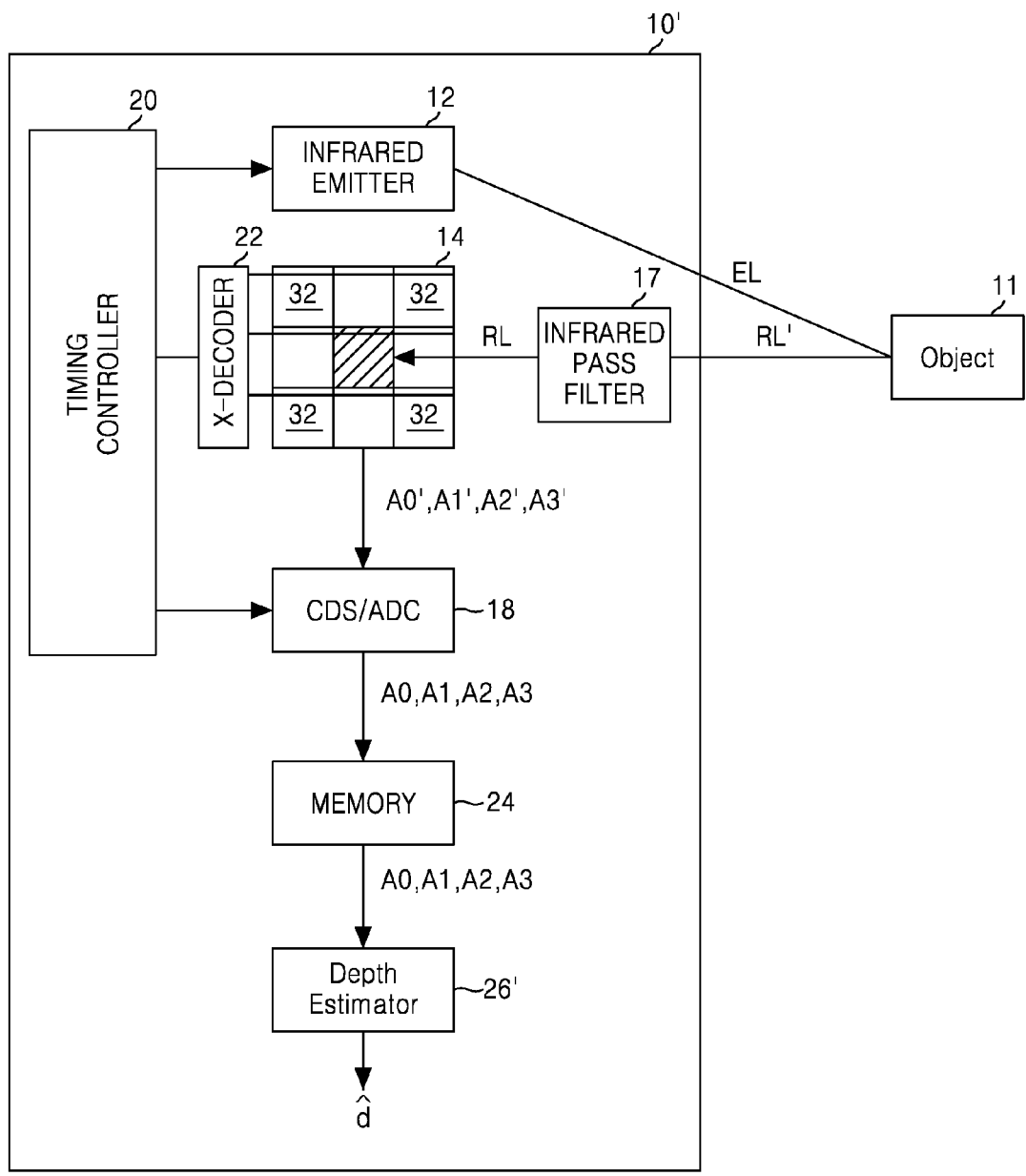
FIG. 10 is a block diagram of a depth sensor including a depth pixel with a 1-tap pixel structure according to an exemplary embodiment.
Figure 11:
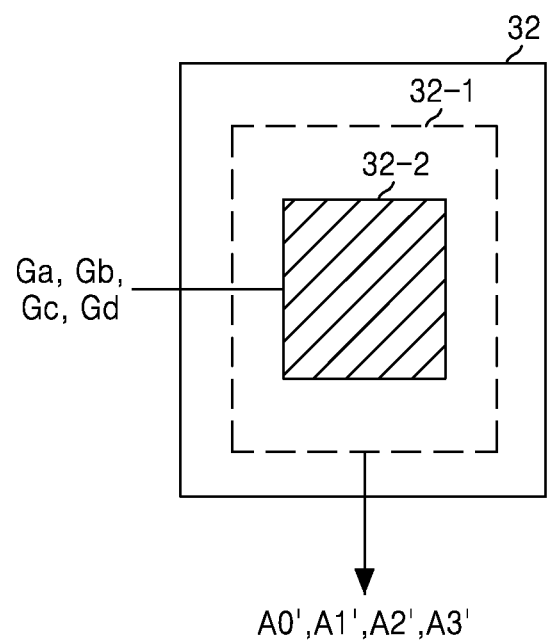
FIG. 11 is a layout of the depth pixel with the 1-tap pixel structure illustrated in FIG. 10.
Figure 12:
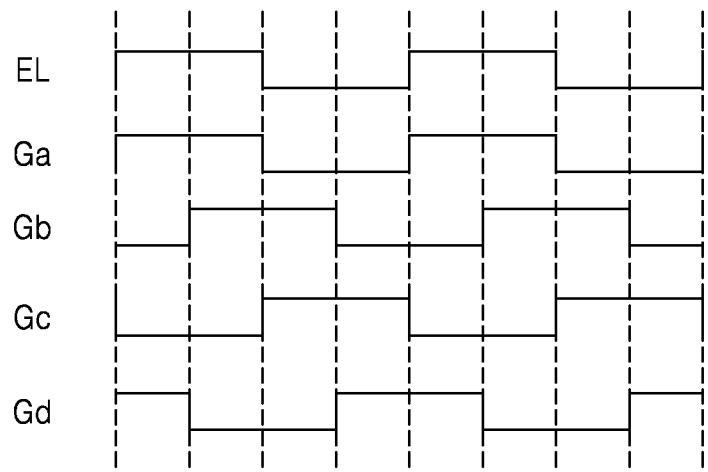
FIG. 12 is a diagram of gate signals applied to the 1-tap pixel structure illustrated in FIG. 11.
Figure 13:
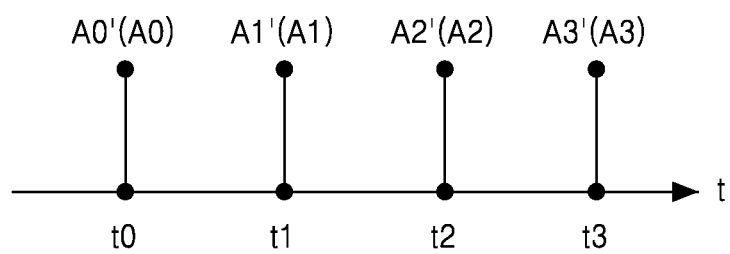
FIG. 13 is a conceptual diagram of a method of estimating digital frame signals using the depth sensor illustrated in FIG. 10.

FIG. 10 is a block diagram of a depth sensor 10' including a depth pixel 32 with a 1-tap pixel structure according to an exemplary embodiment of the present disclosure. FIG. 11 is a layout of the depth pixel 32 with the 1-tap pixel structure illustrated in FIG. 10. FIG. 12 is a diagram of gate signals applied to the 1-tap pixel structure illustrated in FIG. 11. FIG. 13 is a conceptual diagram of a method of estimating digital frame signals using the depth sensor 10' illustrated in FIG. 10.

The depth pixel 32 having the 1-tap pixel structure includes a photoelectric converter 32-2 in an active region 32-1. The active region 32-1 includes the photoelectric converter 32-2 corresponding to the photoelectric converter 16-3 and a plurality of transistors, as illustrated in FIG. 4.

Referring to FIG. 12, the gate signals Ga, Gb, Gc, and Gd respectively having 0-degree, 90-degree, 180-degree and 270-degree phase differences from the optical signal EL emitted from the infrared emitter 12 are sequentially applied to the photoelectric converter 32-2. The photoelectric converter 32-2 performs photoelectric conversion according to the reflected optical signal RL while each of the gate signals Ga, Gb, Gc, and Gd is at a high level. Photocharges generated by the photoelectric converter 32-2 are transferred to the floating diffusion node FD.

Referring to FIGS. 12 and 13, the depth pixel 32 having the 1-tap pixel structure outputs a first frame signal A0' in response to the first gate signal Ga having a 0-degree phase difference from the optical signal EL at a first time point t0, outputs a second frame signal A1' in response to the second gate signal Gb having a 90-degree phase difference from the optical signal EL at a second time point t1, outputs a third frame signal A2' in response to the third gate signal Gc having a 180-degree phase difference from the optical signal EL at a third time point t2, and outputs a fourth frame signal A3' in response to the fourth gate signal Gd having a 270-degree phase difference from the optical signal EL at a fourth time point t3.

The digital circuit 18 performs CDS and ADC on each of the frame signals A0' through A3' and outputs digital frame signals A0, A1, A2, and A3. The digital frame signals A0 through A3 are stored in the memory 24.

A depth estimator 26' calculates a phase difference $\hat{\theta}$ between the optical signal EL output from the infrared emitter 12 and the reflected optical signal RL from the object using Equation (6) and estimates a depth to the object 11 based on the phase difference $\hat{\theta}$:

$$\hat{\theta} = \tan^{-1} \frac{A_1(t_1) - A_3(t_3)}{A_0(t_0) - A_2(t_2)} \quad (6)$$

The above description was related to the estimation of a depth to the object, which is performed by the depth estimator 26' when any one of the frame signals A0 through A3 provided from the memory 24 is not omitted. However, when the depth sensor 10' operates at high speed, a probability of omission of a frame signal output from the memory 24 increases and an error occurs in depth estimation to the object due to the omission of the frame signal.

Figure 14:
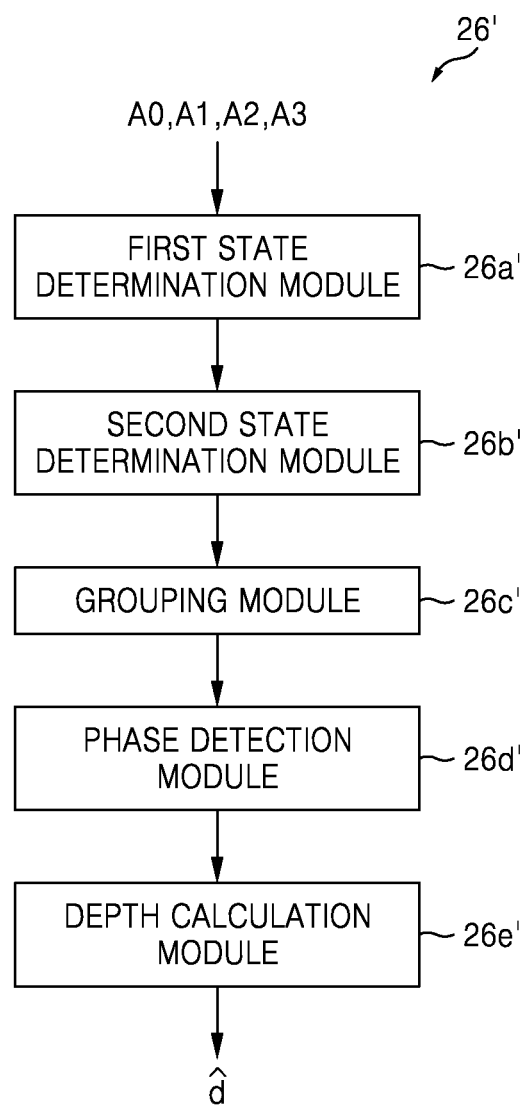
FIG. 14 is a block diagram of a depth estimator illustrated in FIG. 10.

The depth estimator 26' compensates for a depth estimation error that may occur due to the omission of a frame signal. For instance, the depth estimator 26' groups a plurality of frame signals into frame signal groups that can be used to estimate the depth to the object 11 without an error in consideration of the existence of an omitted frame signal among the frame signals A0 through A3 and a continuous pattern of the plurality of frame signals, and then estimates the depth to the object 11 using each of the frame signal groups FIG. 14 is a block diagram of the depth estimator 26' illustrated in FIG. 10. Referring to FIG. 14, the depth estimator 26' includes a first state determination module 26a', a second state determination module 26b', a grouping module 26c', a phase detection module 26d', and a depth calculation module 26e'.

The first state determination module 26a' compares frame information of a current frame signal with frame information of a previous frame signal among a plurality of frame signals provided from the memory 24, determines existence or non-existence of an omitted frame signal based on a comparison result, and generates an index value indicating the existence or non-existence of an omitted frame signal. The second state determination module 26b' compares the frame information of the current frame signal with the index values and determines the continuous pattern of the plurality of frame signals based on a comparison result.

The grouping module 26c' groups the plurality of frame signals into a plurality of frame signal groups based on the existence of an omitted frame signal in the frame signals provided from the memory 24 and the continuous pattern of the frame signals. At this time, a current frame signal group and a previous frame signal group share at least one frame signal with each other. In other words, like the grouping module 26b illustrated in FIG. 7, the grouping module 26c' groups the frame signals using the moving window so that an error does not occur in calculation of the depth to the object.

Table 2 shows examples of frame information of frame signals provided from the memory 24 and index values generated by the first state determination module 26a'.

TABLE 2

| Time | t1 | t2 | t3 | t4 | t5 | t6 | t7 | t8 | t9 | t10 | t11 |
|------|----|----|----|----|----|----|----|----|----|-----|-----|
| pf   | 3  | 0  | 1  | 2  | 3  | 0  | 2  | 3  | 0  | 1   | 2   |
| f    | 0  | 1  | 2  | 3  | 0  | 2  | 3  | 0  | 1  | 2   | 3   |
| n    | 1  | 2  | 3  | 0  | 1  | 2  | 2  | 2  | 2  | 3   | 0   |

Here, "n" is an index value indicating existence or non-existence of an omitted frame signal. Referring to Table 2, in the 1-tap pixel structure the frame signals A0, A1, A2, and A3 are sequentially output in a continuous loop, and values 0, 1, 2, and 3 of frame information also sequentially change in a continuous, sequential loop corresponding to the frame signals A0 through A3.

The first state determination module 26a' determines that no frame signal is omitted from the plurality of frame signals provided from the memory 24 when frame information "f" of a current frame signal and frame information "pf" of a previous signal is (1, 0), (2, 1), (3, 2) or (0, 3). For instance, the first state determination module 26a' determines that the frame signal A1 is omitted at a time point t6 in Table 2 since current and previous frame information is (2, 0).

For the index value "n", values of 1, 2, 3, and 0 are sequentially repeated in a continuous loop according to frame signals. Referring to Table 2, the index value "n" is set to "2" corresponding to current frame information at the time point t6 where there is omission of a frame signal, remains set to "2" through a time point t9, and then changes again at a time point t10 at which time the index value resumes changing according to the continuous loop. The time point t9 is a point at which frame signal grouping allowing the depth to the object 11 to be estimated without an error is possible since the time point t6 is where frame signal omission occurs in a moving window manner.

According to the frame signal grouping using the moving window, after a frame signal group corresponding to time points t6 through t9, a frame signal group corresponding to time points t7 through t10 and a frame signal group corresponding to time points t8 through t11 are used for the estimation of the depth to the object 11. In other words, the second state determination module 26b' compares the current frame information "f" with the index value "n" and determines whether the continuous pattern of a current frame signal and three previous frame signals right before the current frame signal is the pattern that allows the depth to the object 11 to be estimated without an error in a moving window manner.

Accordingly, the grouping module 26c' can group the plurality of frame signals provided from the memory 24 into a plurality of frame signals groups that can be used to estimate the depth to the object without an error based on the existence or non-existence of an omitted frame signal determined by the first state determination module 26a' and the continuous pattern of the frame signals determined by the second state determination module 26b'. Referring to Table 2, the grouping module 26c' groups a current frame signal and its three previous frame signals into a single frame signal group when the frame information "f" of the current frame signal and the index value "n" is (3, 0), (2, 3), (1, 2), or (0, 1).

If a frame signal group corresponding to the time points t5 through t8 including the time point t6 where frame signal omission occurs is used in the estimation of the depth to the object 11, an error occurs in calculation of the phase difference $\hat{\theta}$ between the optical signal EL and the reflected optical signal RL as shown in Equation (7):

$$\hat{\theta} = \tan^{-1} \frac{A_2(t_6) - A_0(t_8)}{A_0(t_5) - A_3(t_7)} \quad (7)$$

However, the phase difference $\hat{\theta}$ calculated using the frame signal group corresponding to the time points t6 through t9 in consideration of an omitted frame signal does not have an error, as shown in Equation (8):

$$\hat{\theta} = \tan^{-1} \frac{A_1(t_9) - A_3(t_7)}{A_0(t_8) - A_2(t_6)} \quad (8)$$

The operation of the depth sensor 10' including the depth estimator 26' illustrated in FIG. 10 is the similar to that of the depth sensor 10 illustrated in FIG. 1 except for a procedure of depth estimation. Therefore, only depth estimation of the depth estimator 26' will be described below.

Figure 15:
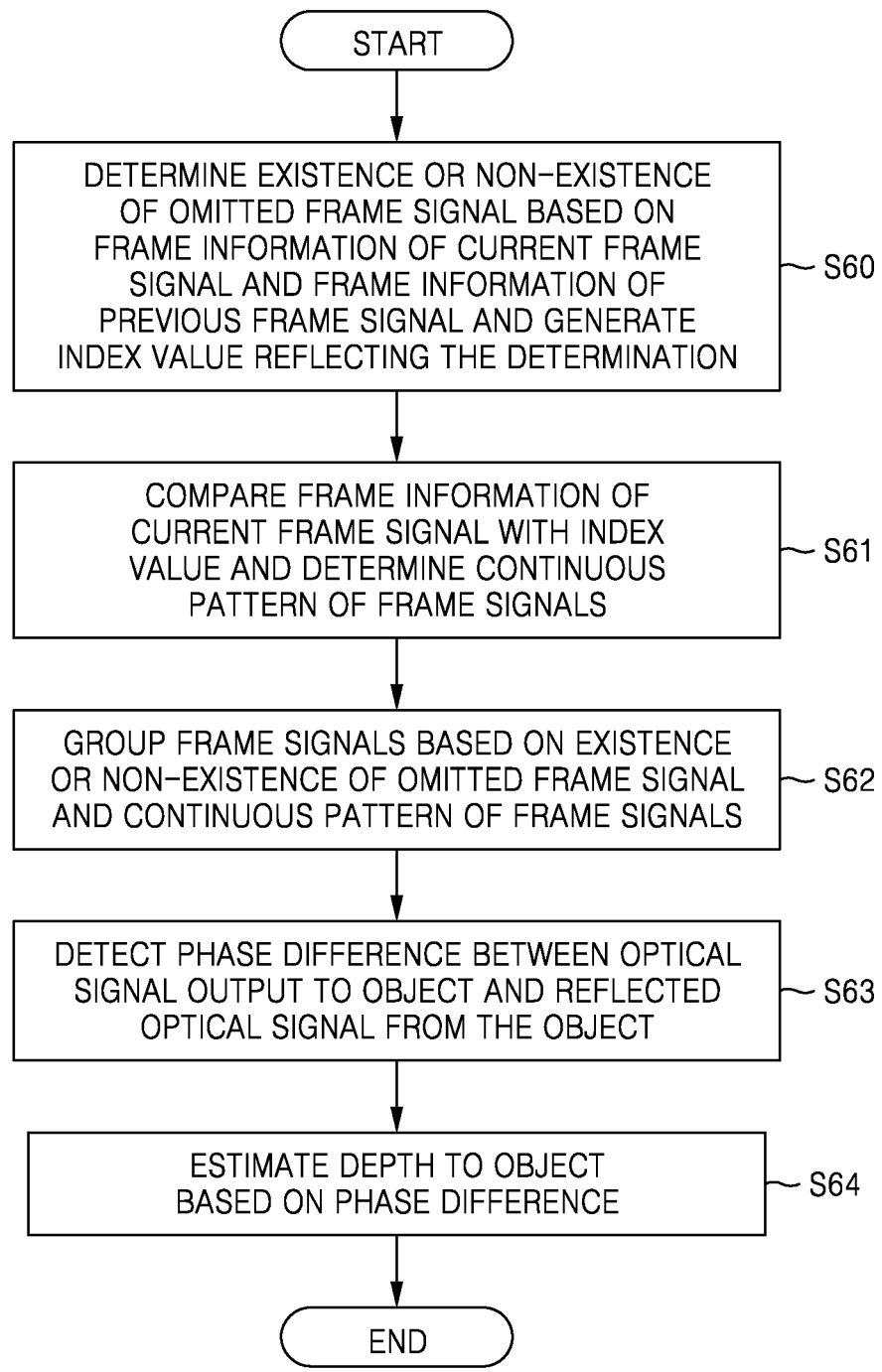
FIG. 15 is a flowchart of a procedure of depth estimation performed by the depth estimator illustrated in FIG. 10.

FIG. 15 is a flowchart of a procedure of depth estimation performed by the depth estimator 26' illustrated in FIG. 10. The procedure will be sequentially described with reference to FIGS. 10, 14, and 15 below.

The first state determination module 26a' compares frame information of a current frame signal and frame information of a previous frame signal among a plurality of frame signals provided from the memory 24, determines existence or non-existence of an omitted frame signal, and generates an index value indicating the existence or non-existence of an omitted frame signal in operation S60. The second state determination module 26b' compares the frame information of the current frame signal with the index value and determines a continuous pattern of the plurality of frame signals in operation S61.

The grouping module 26c' groups the plurality of frame signals into a plurality of frame signal groups based on the existence or non-existence of an omitted frame signal and the continuous pattern of the plurality of frame signals in operation S62. The phase detection module 26d' detects a phase difference between the optical signal EL output to the object 11 and the reflected optical signal RL from the object 11 based on a ratio between a difference between two frame signals and a difference between two other frame signals in each of the frame signal groups in operation S63. The depth calculation module 26e' estimates a depth to the object 11 based on a frequency of the optical signal EL and the phase difference in operation S64.

Each of the elements included in the depth sensor 10 or 10' according to the exemplary embodiments of the present disclosure may be implemented in software, hardware (e.g., one or more processors), or a combination thereof for realizing the technical spirit of the general inventive concept. In addition, the depth sensor 10 or 10' may be mounted using various types of packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi-chip package (MCP), wafer-level fabricated package (WFP), and wafer-level processed stack package (WSP).

A depth estimation method using the depth sensor 10 or 10' according to the exemplary embodiments of the present disclosure may be embodied as computer readable codes on a computer readable recording medium. The depth estimation method may be realized by executing a computer program for performing the depth estimation method, which is stored in the computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and other non-transitory computer readable recording medium. The computer readable recording medium can also be distributed over network coupled computer systems so that the computer readable code is stored and executed in a distributed fashion. Also, functional programs, codes, and code segments for accomplishing the depth estimation method using the depth sensor 10 or 10' can be easily construed by programmers skilled in the art to which the present disclosure pertains.

Figure 16:
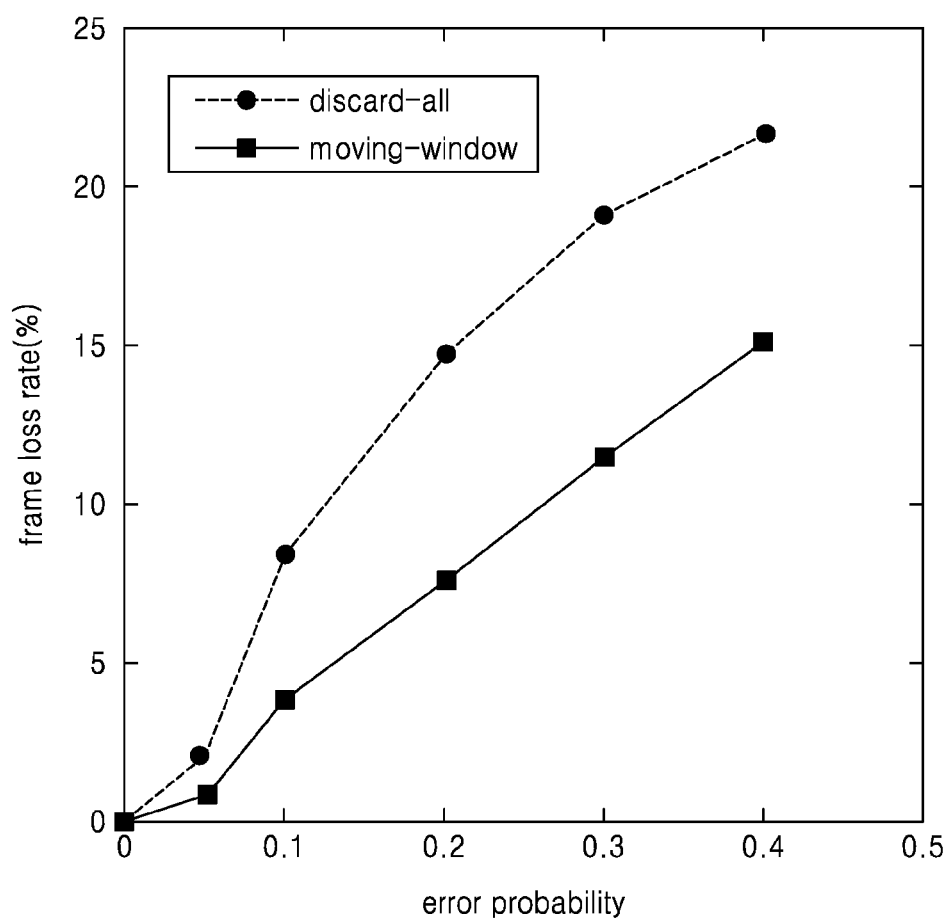
FIG. 16 is a graph showing a result of simulating analysis of performance of a conventional depth sensor and a depth sensor according to one or more exemplary embodiments.

FIG. 16 is a graph showing a result of simulating analysis of performance of a related art depth sensor and a depth sensor according to one or more exemplary embodiments of the present disclosure. The x-axis is a probability of error occurrence in depth estimation and the y-axis is a rate of frame signals that are not used in the depth estimation. As for frame signal grouping, while a related art depth sensor excludes a frame signal group including an omitted frame signal from the depth estimation, which is referred to as "discard-all", the depth sensor according to one or more exemplary embodiments of the present disclosure uses a moving window.

Referring to FIG. 16, the depth sensor according to one or more exemplary embodiments of the present disclosure uses more frame signals in depth estimation than the related art depth sensor, thereby providing more natural depth images than the related art depth sensor.

Figure 17:
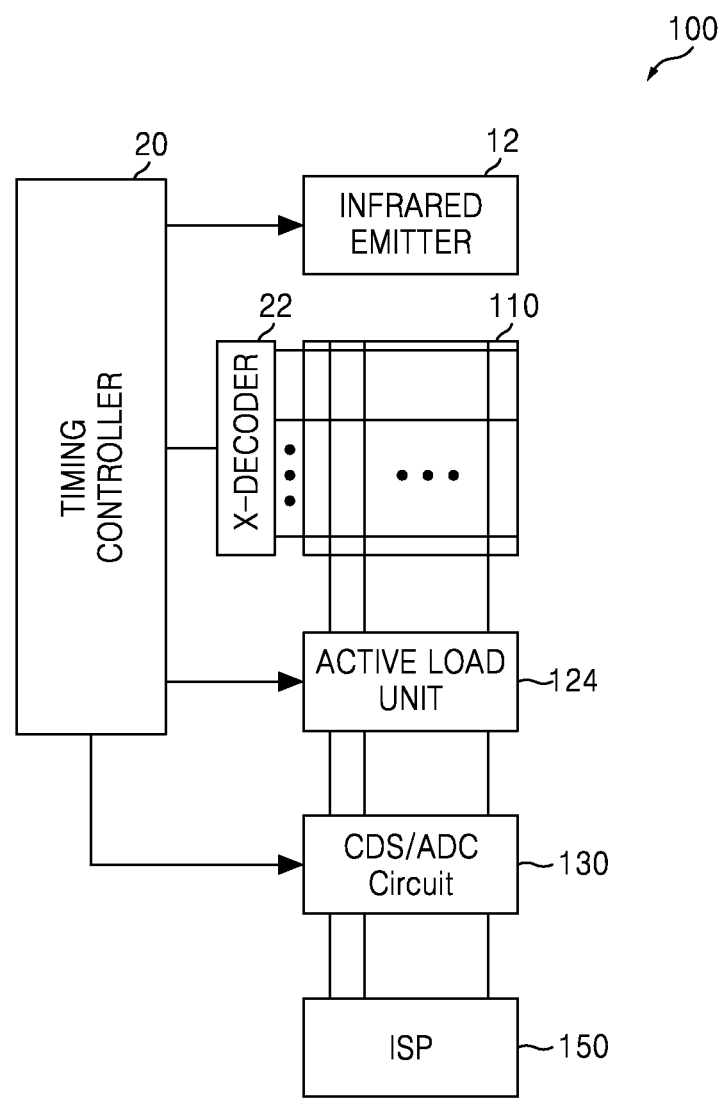
FIG. 17 is a block diagram of a three-dimensional (3D) image sensor according to one or more exemplary embodiments.

FIG. 17 is a block diagram of a three-dimensional (3D) image sensor 100 according to one or more exemplary embodiments of the present disclosure. The 3D image sensor 100 is a device that combines a function of measuring depth information using a depth pixel and a function of measuring color information (e.g., red (R), green (G) or blue (G) color information) using a color (e.g., R, G or B) pixel so as to provide 3D image information.

The 3D image sensor 100 includes a infrared emitter 12, a timing controller 20, a pixel array 110, a row decoder 22, an active load unit 124, a CDS/ADC circuit 130, and an image signal processor (ISP) 150. The 3D image sensor 100 may also include a column decoder (not shown). The column decoder decodes column addresses output from the timing controller 20 and outputs column selection signals. The infrared emitter 12 may be implemented by a light source that generates a light signal, i.e., a modulated infrared signal. While the infrared emitter has been particularly shown and described with reference to exemplary embodiments thereof, it will be understood by those of ordinary skill in the art that various changes in forms and details may be made without departing from the scope of the present disclosure. For example, the present disclosure is not limited to the infrared emitter, and other types of emitters may be used.

The row decoder 22 generates control signals for controlling the operation of each pixel included in the pixel array 110. The timing controller 20 generates the gate signals Ga, Gb, Gc, and Gd for driving a depth pixel. Alternatively, the row decoder may generate the gate signals Ga, Gb, Gc, and Gd in compliance with the timing controller 20.

The pixel array 110 includes a plurality of pixels (not shown). The plurality of pixels include at least two pixels among a red pixel, a green pixel, a blue pixel, a depth pixel, a magenta pixel, a cyan pixel, and a yellow pixel, which are respectively disposed at intersections of a plurality of row lines and a plurality of column lines in a matrix form.

The row decoder 22 selects one of the row lines included in the pixel array 110 in response to control signals output from the timing controller 20. The column decoder selects one of the column lines included in the pixel array 110 in response to control signals output from the timing controller 20. Accordingly, one of the pixels in the pixel array 110 is selected by the row decoder 22 and the column decoder. A pixel signal (e.g., depth information or color information) output from the selected pixel is transmitted to the CDS/ADC circuit 130 through the active load unit 124. The active load unit 124 transmits pixel signals output through a plurality of column lines to the CDS/ADC circuit 130 according to a bias voltage output from the timing controller 20.

The CDS/ADC circuit 130 converts a pixel signal (e.g., depth information or color information) output from the pixel array 110 into a digital signal. In other words, the CDS/ADC circuit 130 performs CDS on a pixel signal (e.g., depth or color information) output from the pixel array 110 to generate a CDS signal and performs ADC on the CDS signal to output a digital signal.

The ISP 150 detects a digital pixel signal (e.g., depth or color information) from the digital signal output from the CDS/ADC circuit 130. The ISP 150 may include the memory 24 and/or the depth estimator 26 illustrated in FIG. 1 or the memory 24 and/or the depth estimator 26' illustrated in FIG. 10. The ISP 150 may estimate depth information using the depth estimation method described above and combine the depth information and color information to generate a 3D image signal. At this time, the ISP 150 may interpolate a pixel signal output from each of the pixels included in the pixel array 110 and generate a 3D image signal based on interpolated pixel information. The memory 24 illustrated in FIG. 1 may be implemented within the CDS/ADC circuit 130 illustrated in FIG. 17.

Figure 18:
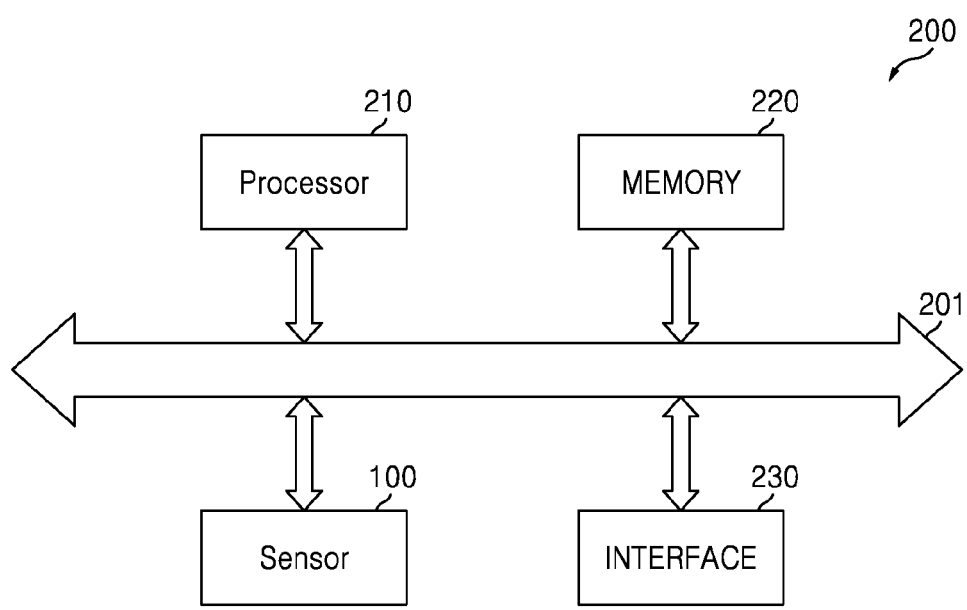
FIG. 18 is a block diagram of an image processing system including the 3D image sensor illustrated in FIG. 17.

FIG. 18 is a block diagram of an image processing system 200 including the 3D image sensor 100 illustrated in FIG. 17. The image processing system 200 includes the 3D image sensor 100 and a processor 210.

The processor 210 controls the operation of the 3D image sensor 100. The processor 210 may store a program for controlling the operation of the 3D image sensor 100. Alternatively, the processor 210 may access a separate memory (not shown) storing the program for controlling the operation of the 3D image sensor 100 and execute the program stored in the memory.

The 3D image sensor 100 generates 3D image information based on a digital pixel signal (e.g., color or depth information) in compliance with the processor 210. The 3D image information may be displayed on a display (not shown) connected to an interface 230. The 3D image information generated by the 3D image sensor 100 may be stored in a memory device 220 through a bus 201 in compliance with the processor 210. The memory device 220 may be a non-volatile memory device. The interface 230 inputs and outputs the 3D image information and may be implemented by a wireless interface.

Figure 19:
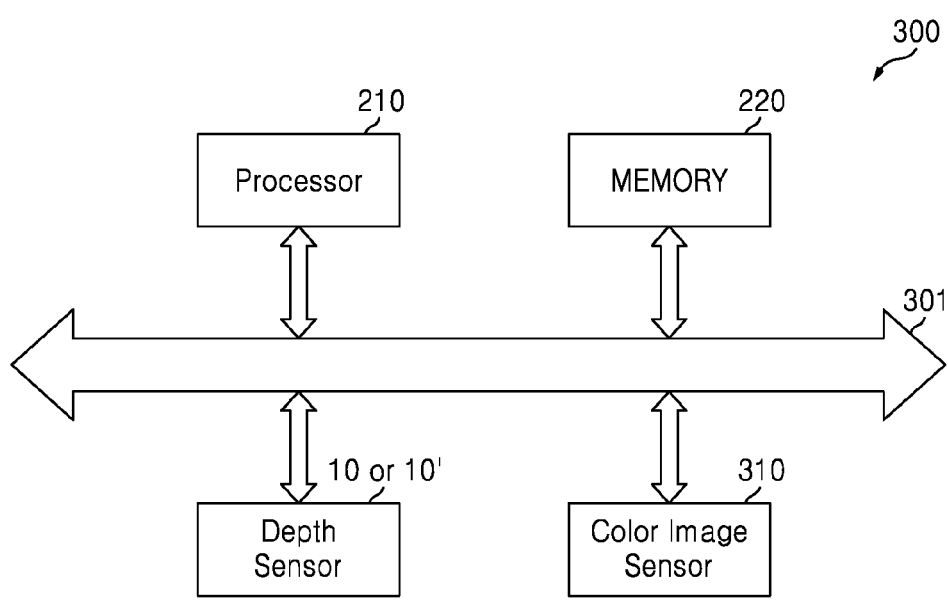
FIG. 19 is a block diagram of an image processing system including an image sensor and a depth sensor according to one or more exemplary embodiments.

FIG. 19 is a block diagram of an image processing system 300 including an image sensor 310 and the depth sensor 10 or 10' according to one or more exemplary embodiments of the present disclosure. The image processing system 300 includes the depth sensor 10 or 10', the color image sensor 310 including RGB color pixels, and the processor 210. It is illustrated in FIG. 19 that the depth sensor 10 or 10' and the color image sensor 310 are physically separated for clarity of the description, but the depth sensor 10 or 10' and the color image sensor 310 may physically share signal processing circuits with each other.

The color image sensor 310 may be an image sensor including a pixel arraying including only color pixels, e.g., red, green and blue pixels, without depth pixels. At this time, the processor 210 may generate 3D image information based on depth information estimated or calculated by the depth sensor 10 or 10' and color information (e.g., at least one color information among red, green, blue, magenta, cyan, and yellow information) output from the color image sensor 310, and display the 3D image information on a display. The 3D image information generated by the processor 210 may be stored in the memory device 220 through a bus 301.

The image processing systems 200 and 300 respectively illustrated in FIGS. 18 and 19 may be used in 3D distance meters, game controllers, depth cameras, and gesture sensing apparatuses.

Figure 20:
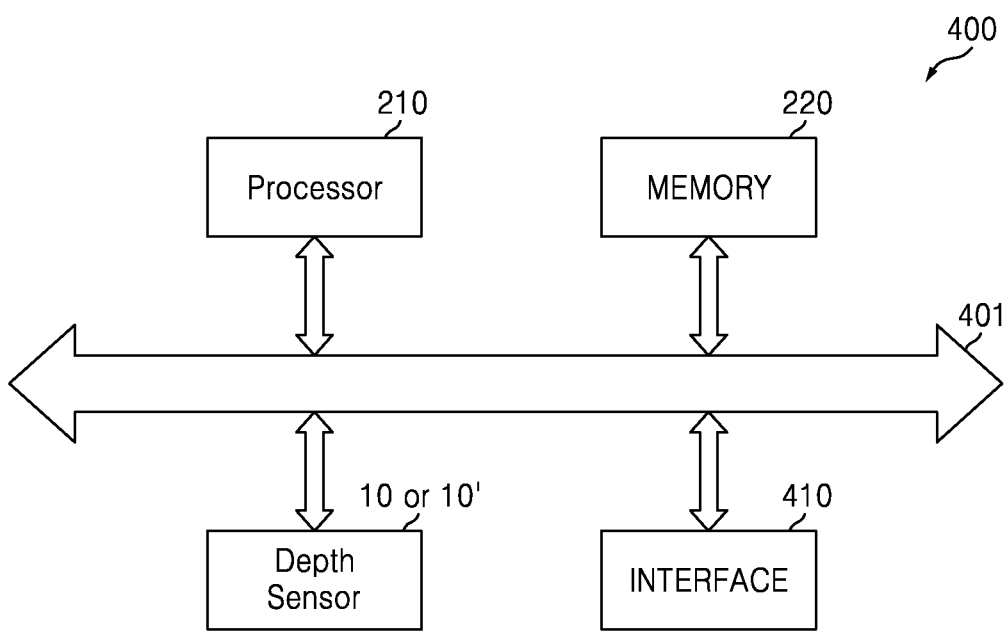
FIG. 20 is a block diagram of a signal processing system including a depth sensor according to one or more exemplary embodiments.

FIG. 20 is a block diagram of a signal processing system 400 including the depth sensor 10 or 10' according to one or more exemplary embodiments of the present disclosure. The signal processing system 400, which functions as a depth (or distance) measuring sensor, includes the depth sensor 10 or 10' and the processor 210.

The processor 210 may calculate distance or depth information between the signal processing system 400 and an object (or a target) based on depth information output from the depth sensor 10 or 10'. The distance or depth information calculated by the processor 210 may be stored in the memory device 220 through a bus 401.

As described above, according to the exemplary embodiments of the present disclosure, a depth estimation error that may occur during high-speed operation due to omission of a frame signal is compensated for, so that more natural depth images are provided.

While the general inventive concept has been particularly shown and described with reference to exemplary embodiments thereof, it will be understood by those of ordinary skill in the art that various changes in forms and details may be made therein without departing from the spirit and scope of the present disclosure as defined by the following claims.

What is claimed is:

1. A depth estimation method comprising the operations of:
outputting an optical signal, using a light source device, to an object;
generating a plurality of frame signals based on a reflected optical signal received from the object and a plurality of gate signals periodically applied to a depth pixel with predetermined phase differences from the optical signal, and providing the plurality of frame signals and frame information of each of the plurality of frame signals for estimation of a depth to the object;
grouping the plurality of frame signals into a plurality of frame signal groups which are used to estimate the depth to the object without a depth estimation error caused by an omission of a frame signal, wherein the grouping of the plurality of frame signals is based on whether an omitted frame signal exists in the plurality of frame signals and based on a continuous pattern of the plurality of frame signals; and estimating the depth to the object using each of the plurality of frame signal groups.

2. The depth estimation method of claim 1, wherein the grouping the plurality of frame signals into the plurality of frame signal groups comprises:

comparing frame information of a current frame signal among the plurality of frame signals with frame information of a previous frame signal among the plurality of frame signals, detecting the omitted frame signal in the plurality of frame signals based on a comparison result, and determining the continuous pattern of the plurality of frame signals based on the comparison result; and grouping the plurality of frame signals into the plurality of frame signal groups based on whether the omitted frame signal exists and based on the continuous pattern of the plurality of frame signals.

3. The depth estimation method of claim 2, wherein a current frame signal group and a previous frame signal group share at least one frame signal with each other.

4. The depth estimation method of claim 2, wherein the estimating the depth to the object comprises:

detecting a phase difference between the optical signal output to the object and the reflected optical signal received from the object based on a ratio between a difference between two frame signals and a difference between two other frame signals in each of the plurality of frame signal groups; and estimating the depth to the object based on a frequency of the optical signal and the phase difference.

5. The depth estimation method of claim 4, wherein the phase difference is a value of an arc tangent to the ratio between the difference between the two frame signals and the difference between the two other frame signals in each frame signal group.

6. The depth estimation method of claim 2, wherein, if the omitted frame signal is detected, determining whether at least two frame signals among the plurality of frame signals would result in the error when grouped together, and, if the error would result, excluding the at least two frame signals from forming a group of the plurality of frame signal groups.

7. The depth estimation method of claim 1, wherein the grouping the plurality of frame signals into the plurality of frame signal groups comprises:

comparing frame information of a current frame signal among the plurality of frame signals with frame information of a previous frame signal among the plurality of frame signals, determining whether the omitted frame signal exists based on a first comparison result, and generating an index value which indicates whether the omitted frame signal exists;

comparing the frame information of the current frame signal with the index value, and determining the continuous pattern of the plurality of frame signals based on a second comparison result; and grouping the plurality of frame signals into the plurality of frame signal groups based on whether the omitted frame signal exists and based on the continuous pattern of the plurality of frame signals.

8. The depth estimation method of claim 7, wherein a current frame signal group and a previous frame signal group share at least one frame signal with each other.

9. The depth estimation method of claim 7, wherein the estimating of the depth to the object comprises:

detecting a phase difference between the optical signal output to the object and the reflected optical signal received from the object based on a ratio between a difference between two frame signals and a difference between two other frame signals in each of the plurality of frame signal groups; and estimating the depth to the object based on a frequency of the optical signal and the phase difference.

10. The depth estimation method of claim 9, wherein the phase difference is a value of an arc tangent to the ratio between the difference between the two frame signals and the difference between the two other frame signals in each frame signal group.

11. A depth sensor comprising:

a light source which outputs an optical signal to an object;

a depth pixel which generates a plurality of frame signals based on a reflected optical signal received from the object and a plurality of gate signals periodically received with predetermined phase differences from the optical signal;

a digital circuit which converts the plurality of frame signals into digital signals and outputs the digital signals;

a memory which stores and provides the plurality of frame signals and frame information of each of the plurality of frame signals for estimation of a depth to the object; and a depth estimator which groups the plurality of frame signals into a plurality of frame signal groups which are used to estimate the depth to the object without a depth estimation error caused by an omission of a frame signal, wherein the depth estimator groups the plurality of frame signals based on whether an omitted frame signal exists in the plurality of frame signals and based on a continuous pattern of the plurality of frame signals, and the depth estimator estimates the depth to the object using each of the plurality of frame signal groups.

12. The depth sensor of claim 11, wherein the depth estimator comprises:

a state determination module which compares frame information of a current frame signal among the plurality of frame signals with frame information of a previous frame signal among the plurality of frame signals and, based on a comparison result, detects the omitted frame signal in the plurality of frame signals and determines the continuous pattern of the plurality of frame signals;

a grouping module which groups the plurality of frame signals into the plurality of frame signal groups based on whether the omitted frame signal exists and based on the continuous pattern of the plurality of frame signals;

a phase detection module which detects a phase difference between the optical signal output to the object and the reflected optical signal received from the object based on a ratio between a difference between two frame signals and a difference between two other frame signals in each of the plurality of frame signal groups; and a depth calculation module which estimates the depth to the object based on a frequency of the optical signal and the phase difference.

13. The depth sensor of claim 12, wherein a current frame signal group and a previous frame signal group share at least one frame signal with each other.

14. The depth sensor of claim 12, wherein the phase difference is a value of an arc tangent to the ratio between the difference between the two frame signals and the difference between the two other frame signals in each frame signal group.

15. The depth sensor of claim 11, wherein the depth estimator comprises:

a first state determination module which compares frame information of a current frame signal among the plurality of frame signals with frame information of a previous frame signal among the plurality of frame signals, determines whether the omitted frame signal exists based on a first comparison result, and generates an index value which indicates whether the omitted frame signal exists;

a second state determination module which compares the frame information of the current frame signal with the index value and determines the continuous pattern of the plurality of frame signals based on a second comparison result;

a grouping module which groups the plurality of frame signals into the plurality of frame signal groups based on whether the omitted frame signal exists and based on the continuous pattern of the plurality of frame signals;

a phase detection module which detects a phase difference between the optical signal output to the object and the reflected optical signal received from the object based on a ratio between a difference between two frame signals and a difference between two other frame signals in each of the plurality of frame signal groups; and a depth calculation module which estimates the depth to the object based on a frequency of the optical signal and the phase difference.

16. The depth sensor of claim 15, wherein a current frame signal group and a previous frame signal group share at least one frame signal with each other.

17. The depth sensor of claim 15, wherein the phase difference is a value of an arc tangent to the ratio between the difference between the two frame signals and the difference between the two other frame signals in each frame signal group.

18. The depth estimation device comprising:
a depth sensor; and
a processor which controls an operation of the depth sensor, the depth sensor comprising:
  a light source which outputs an optical signal to an object;
  a depth pixel which generates a plurality of frame signals based on a reflected optical signal received from the object and a plurality of gate signals periodically received with predetermined phase differences from the optical signal;
  a digital circuit which converts the plurality of frame signals into digital signals and outputs the digital signals;
  a memory which stores and provides the plurality of frame signals and frame information of each of the plurality of frame signals for estimation of a depth to the object; and
  a depth estimator which groups the plurality of frame signals into a plurality of frame signal groups which are used to estimate the depth to the object without a depth estimation error caused by an omission of a frame signal, wherein the depth estimator groups the plurality of frame signals based on whether an omitted frame signal exists in the plurality of frame signals and based on a continuous pattern of the plurality of frame signals and to estimate the depth to the object using each of the plurality of frame signal groups.

19. The depth estimation device of claim 18, wherein the depth estimator comprises:
a state determination module which compares frame information of a current frame signal among the plurality of frame signals with frame information of a previous frame signal among the plurality of frame signals and, based on a comparison result, detects the omitted frame signal in the plurality of frame signals and determines the continuous pattern of the plurality of frame signals;
a grouping module which groups the plurality of frame signals into the plurality of frame signal groups based on whether the omitted frame signal exists and based on the continuous pattern of the plurality of frame signals;
a phase detection module which detects a phase difference between the optical signal output to the object and the reflected optical signal received from the object based on a ratio between a difference between two frame signals and a difference between two other frame signals in each of the plurality of frame signal groups; and
a depth calculation module which estimates the depth to the object based on a frequency of the optical signal and the phase difference.

20. The depth estimation device of claim 18, wherein the depth estimator comprises:
a first state determination module which compares frame information of a current frame signal among the plurality of frame signals with frame information of a previous frame signal among the plurality of frame signals, determines whether the omitted frame signal exists based on a first comparison result, and generates an index value which indicates whether the omitted frame signal exists;
a second state determination module which compares the frame information of the current frame signal with the index value and determines the continuous pattern of the plurality of frame signals based on a second comparison result;
a grouping module which groups the plurality of frame signals into the plurality of frame signal groups based on whether the omitted frame signal exists and based on the continuous pattern of the plurality of frame signals;
a phase detection module which detects a phase difference between the optical signal output to the object and the reflected optical signal received from the object based on a ratio between a difference between two frame signals and a difference between two other frame signals in each of the plurality of frame signal groups; and
a depth calculation module which estimates the depth to the object based on a frequency of the optical signal and the phase difference.

* * * * *